United States Patent [19]

Malaval

[11] 3,836,286
[45] Sept. 17, 1974

[54] PROCESS FOR PUMPING LIQUID METALS BY A DRIVE EFFECT AND A PUMP IMPLEMENTING THIS PROCESS

[75] Inventor: Claude Malaval, Antony, France

[73] Assignee: Groupement Atomique Alsacienne Atlantique, Le Plessis Robinson, France

[22] Filed: Mar. 30, 1973

[21] Appl. No.: 346,385

[30] Foreign Application Priority Data
Mar. 30, 1972 France .............................. 72.11245

[52] U.S. Cl.................... 417/50, 417/54, 417/76, 417/87
[51] Int. Cl............................................. F04f 1/18
[58] Field of Search ............ 417/50, 53, 54, 55, 76, 417/87

[56] References Cited
UNITED STATES PATENTS
2,811,107  10/1957  Brill ..................................... 417/50
3,187,672  6/1965   Baker.................................. 417/50
3,251,302  5/1966   Baker.................................. 417/50

Primary Examiner—C. J. Husar
Assistant Examiner—Richard Sher
Attorney, Agent, or Firm—Sughrue, Rothwell, Mion, Zinn & Macpeak

[57] ABSTRACT

A process for pumping liquid metals and a pump for implementing this process, providing a high flow rate at high pressure. By means of a rotating magnetic field created by applying a tension to the windings of the stator, the liquid metal contained in the bell is driven in rotation and ejected by the effect of centrifugal force onto a circular diffusion device with hollow blades, thus causing the liquid metal to be driven directly into the conduits limited by the blades.

14 Claims, 2 Drawing Figures 3,836,286

PROCESS FOR PUMPING LIQUID METALS BY A DRIVE EFFECT AND A PUMP IMPLEMENTING THIS PROCESS

BACKGROUND OF THE INVENTION

1. Field of the Invention

The present invention relates to a process for pumping liquid metals by the effect of drive and obtaining a high flow rate at high pressure. The invention also relates to a device for implementing this process which is relatively small in size.

2. Prior Art

The use of pumps for liquid metals has recently been developed in connection with techniques requiring the circulation of liquid metals used as heat bearing fluids in the field of nuclear energy as well as in foundry work and for the purifying treatment of metals.

Various types of pumps for liquid metals are known to be in current use: electromagnetic conduction pumps, electromagnetic induction (or linear) pumps, and finally mechanical motor driven pumps. Various conduction pumps have recently been described. In a conduction pump of this nature, the liquid metal is set in motion by the electromagnetic force produced by the combined action of an induction and a current. In the case of induction pumps, suitably positioned magnetic circuits induce a sliding magnetic field into the liquid metal. This sliding magnetic field drives the molten metal in translation in the inside of a conduit, thus likening this type of pump to linear motors.

The limitations of devices of this type are readily apparent. In the case of a conduction pump, the need to use conduits having a reduced section limits the flow rates to relatively small values. In the case of an induction pump, it is generally necessary to use a long, bulky device to obtain a sufficiently high flow rate and pressure. The efficiency of the pump is further reduced by the sliding of the fluid with respect to the magnetic field. Mechanical pumps driven by a motor have the major disadvantage of not being able to be positioned freely in the fluid circuit. This leads to the use of long, cumbersome transmission shafts to connect the pump to the motor. Obviously, the latter cannot remain in contact with the liquid metal.

SUMMARY OF THE INVENTION

The present invention makes it possible to obviate these disadvantages by using a rotating field.

The process for pumping liquid metals by the effect of drive consists in removing a fraction of the liquid metal flowing across openings symmetrically disposed about an axis, in accelerating this fraction of liquid metal by means of a magnetic field rotating about the same axis, and in projecting it tangentially to the openings to obtain a drive effect of the entire volume of liquid metal.

The invention also relates to a pump for pumping liquid metals by a drive effect which provides a high flow rate at high pressure. This pump comprises the following coaxial elements: an annular core having a high magnetic permeability, a cylindrical bell and a stator for producing a magnetic field rotating about an axis, characterized in that the inner face of the annular core is integral with a metal structure delimiting conduits terminating in the openings. The conduits are distributed symmetrically about the axis of the pump.

The driving pressure is produced by the centrifugal force of the fraction of liquid metal rotated by the rotating field created by the windings of the stator. The fluid is driven at an approximately synchronized speed which makes it possible to avoid any very considerable sliding with respect to the magnetic field. The pump according to the invention makes it possible to ensure an equally high flow rate of the liquid at high pressure and with an output equivalent to that of existing magnetic pumps, while having a very reduced volume. With respect to mechanical pumps it has the advantage of being able to be placed at a low point in the load circuit of the liquid metal and that it takes up a minimum amount of space.

Other objects, features, and advantages of the present invention will be made apparent from the following detailed description of the preferred embodiment thereof provided by way of example only with reference to the accompanying drawings in which:

DESCRIPTION OF THE PREFERRED EMBODIMENTS

The pump described in the preferred embodiment is a sodium pump utilizable only under load in a liquid sodium circuit such as are used in nuclear power stations, in particular. By being "under load", it is meant that the pump is immersed to a level a little higher than the level of the copper ring 18 at least during the beginning of pumping operations.

Figure 1:
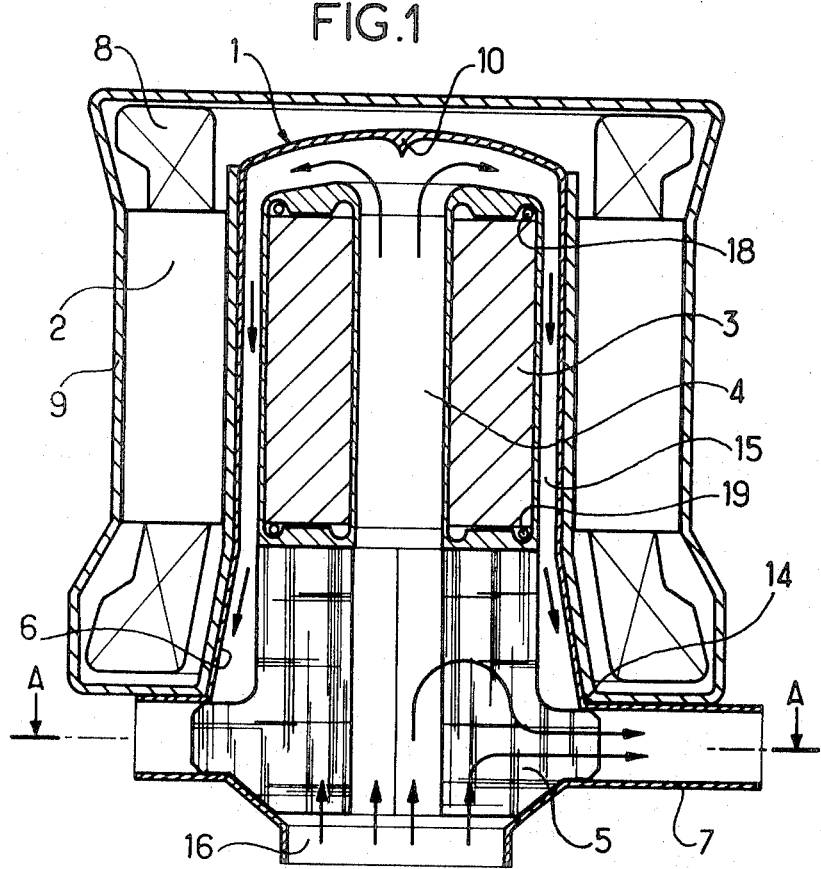
FIG. 1 is a sectional view of a pump according to the invention.

As may be seen from FIG. 1, the pump comprises an inoxidizable steel bell 1, the outer wall of which is entirely surrounded by a laminated stator 2 comprising three-phase windings 8. This stator is comparable to that of an asynchronous motor and may be made, for example, of silicon sheets. The outer face of a core 3 and the inner wall of the bell 1 define an annular space 15.

The sheets of the stator 2 are thermally insulated from the liquid metal by an insulating layer 9, for example, a fiber glass layer disposed between the stator 2 and the outer wall of the bell 1. An approximately conical protuberance 10 is attached internally at the centre of the upper part of the bell 1. The cylindrical, annular core 3 provided with an axial opening 4 is axially disposed inside the bell 1. The outer face of the core 3 and the inner wall of the bell 1 delimit the annular space 15. The entire core 3 is completely coated with a sheet of inoxidizable steel. At its periphery, the core 3 is surrounded by a copper ring 18 disposed at its upper part and by a copper ring 19 disposed at its lower part. The metal structure consisting of a series of hollow blades 5 delimiting spiral-formed conduits is joined below the lower face of the annular core 3. These vertically positioned blades are made of sheets of steel folded back to provide between the two faces a space of constant width open along the trailing edge. At its lower part, the bell 1 comprises a frusto-conical widening 6 joined to the edge of the blades 5.

Figure 2:
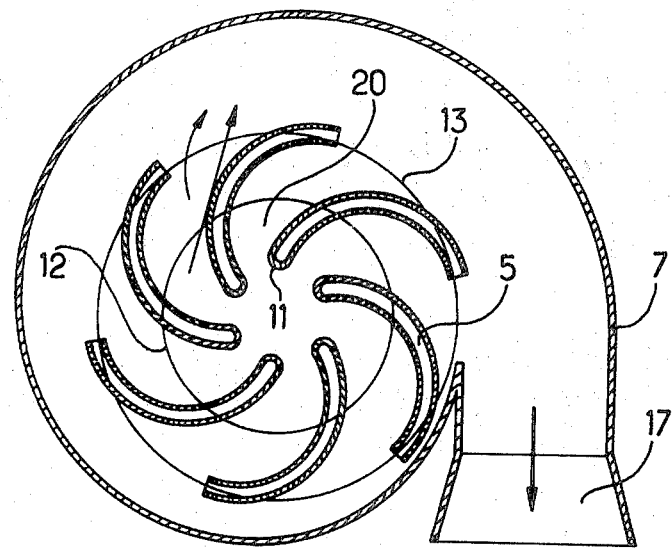
FIG. 2 is a sectional view taken along the line A-A in FIG. 1.

As may be seen from FIG. 2, the unit is closed at the periphery by a conduit 7 in the form of a snail widening progressively towards the outlet 17 and made of inoxidizable sheet steel. From FIG. 2 it may be noted that the fold 11 of the steel sheets of which the blades are made is rounded and that all the edges of the blades are situated on a circle, the radius of which is that of the central opening 4. Two circles are marked on FIG. 2. The circle 12 limits the axial input channel 16 of the fluid and the circle 13 the base 14 of the frusto-conical widening 6.

Because, as previously stated, the pump is immersed in liquid metal at least during the beginning of pumping operations to a level a little higher than the level of the copper ring 18, the duct 4 is initially filled with liquid metal by metallo-static pressure. When voltage is applied to the windings 8 of the stator 2, a rotating field is produced which drives the liquid metal in the duct 4 in rotation. The centrifugal force acting on the liquid metal in turn causes it to move in the direction of the arrows through the annular space limited by the inner wall of the bell 1 and the outer face of the core 3 and into the annular space 15. The exit of the liquid through the top of the duct 4 creates a vacuum, sucking more liquid metal up into the duct 4.

Currents circulating parallel to the generatrices of the cylindrical core 3 are induced by the action of the rotating magnetic field into the conductive liquid medium situated in the annular space 15. These currents close on the copper rings 18 and 19, forming as many spirals as there are poles in the stator.

As previously stated, the liquid metal sucked in at the centre of the lower end of the axial opening 4 is rotated by the rotating field. This has the effect of increasing the pressure of the liquid metal at the upper end of the bell 1. This rotation creates a depression at the centre of the column of liquid limited by the axial opening 4. The protuberance 10 located at the upper part of the bell 1 acts as a vortex regulator and enables any harmful effects to be eliminated. This prerotation reduces the sliding of the metal with respect to the rotating field when the fluid enters the annular section 15. The liquid metal spirals down through the annular section 15 and into the frusto-conical widening 6. It is ejected at a practically synchronized rate, thus producing a suction effect acting on the liquid metal upstream of it. Since velocity of the liquid metal at the output of the annular section 15 between the two circles 12 and 13 in FIG. 2 has a tangential component and a vertical component directed towards the lower end of the blades 5, the exiting liquid metal cannot return inside the circle 12. The liquid metal ejected, brushes the blades 5 tangentially and obliquely, thus creating a depression on their concave part and on their top face close to their trailing edge. In this way, a drive effect is obtained which projects the liquid metal directly into the conduits 20 limited by the successive blades 5. Thus a vastly superior flow rate to the inductive flow coming from the annular section 15 is obtained. To avoid the vibration and cavitation phenomena, which would be produced on the trailing edges of the blades 5, the latter are hollow, thus ensuring a supplementary action across the same due to the depression created at their trailing edges. The centrifugal force of the liquid metal driven in rotation in the conduit 7 makes it possible to obtain a high pressure with a high flow rate at the output.

The low temperature of the liquid sodium allows the magnetic properties of the sheets of the stator and of the central core to be retained. The stator comprising the windings is, as has already been indicated, separated from the bell by an insulating layer. The central core has the same temperature as the sodium.

In the places where the rigidity of the bell is not ensured by the stator and particularly in the upper and lower parts, the thickness of the sheets is such that it is designed to resist the pressure of the liquid metal. The same applies to the sheets forming the circular diffusion device.

Lastly, it is possible, if desired, to regulate the flow rate of this type of pump, either by acting on the frequency or the form of the signal or on the intensity of the electric current supplying the stator windings.

A particular embodiment of the invention utilizing a 100 kw three-phase asynchronous motor having a synchronization rate of 3000 rpm makes it possible to obtain a pressure of some ten bars while still providing a very high flow rate.

Although the device which has been described represents the most advantageous embodiment of the invention, various modifications may be applied without departing from the framework and scope of the invention, and certain elements may be replaced by others capable of fulfilling the same technical function.

What is claimed is:

1. A process for pumping liquid metals for having a drive effect consisting in:

immersing at least partially in a liquid metal a structure having an axial symmetry and comprising a set of curved blades (5) defining between them spiral-form passage, axially removing a fraction of said liquid metal, accelerating said fraction of liquid metal by means of a rotating magnetic field to give a considerable rotation speed, projecting by centrifugal force this fraction of liquid metal into said spiral-form passages tangentially to the convex part of said curved blades (5), creating in the concave part of these curved blades, inside the spiral-form passages, a lowering of pressure initiating a centrifugal motion of the liquid metal inside the spiral-form passages, collecting this liquid metal having now a high centrifugal speed by a spiral collector, transforming this speed into pressure.

2. Immersed pump for liquid metals comprising a vertical axial inlet at its base and a lateral outlet, formed by two vertically superimposed structures, both having axial symmetry:

an upper structure setting in a rotating motion at high speed a fraction of the liquid metal entering the pump, by means of a rotating magnetic field, consisting of the axis towards the periphery of the following elements:

an axial vertical inlet duct (4) for the liquid metal extending the lower inlet orifice (16) of the pump;

an annular core (3) having high magnetic permeability surrounding that axial duct (4);

an annular duct (15) in which the liquid metal is set in a rotating motion;

a bell (1) having a cylindrical shape extended at its base by a frusto conical flared part (6);

a stator 2 producing the rotating magnetic field driving the liquid metal in a rotation motion;

a lower structure setting in motion by the drive effect the remaining fraction of the liquid metal entering the pump consisting of curved vertical blades and a spiral body;

the curved vertical blades (5) being fixed rigidly by their upper part to the base of the annular core (3) of the upper structure and by their lower part to the base of the spiral body;

the spiral body (7) surrounding these blades and extending the frusto-conical part of the bell of the upper structure, collecting the whole of the liquid metal pumped and directing it towards the lateral outlet of the pump (17).

3. Pump for liquid metals having a drive effect according to claim 2, wherein the leading edge of the blades (5) limiting the lower part of the vertical duct (4) is situated in the extension of the internal wall of the annular core (3).

4. A pump for liquid metals operating by a drive effect according to claim 3, wherein the blades (5) are hollow and open at their trailing edge.

5. A pump for liquid metals operating by a drive effect according to claim 4, wherein the base (14) of the frusto-conical widening (6) is joined to a corner of the blades.

6. A pump for liquid metals according to claim 5, wherein the bell (1) comprises at its upper part a protuberance (10) which is approximately conical in shape and which has the same axis as that of the bell.

7. A pump for liquid metals according to claim 6, wherein an insulating layer -(9)- for example, a fiber glass layer, is disposed around the stator (2).

8. A process for pumping liquid metals by a drive effect, said process comprising the steps of:
1. immersing at least partially in a liquid metal a structure having axial symmetry about a vertical axis and comprising a set of curved blades defining between them radially extending, spiral-form passages;
2. axially removing a fraction of said liquid metal;
3. accelerating said fraction of liquid metal by means of a rotating magnetic field to give it a considerable rotation speed;
4. projecting said fraction of liquid metal by means of centrifugal force into said spiral-form passages in a direction tangential to the convex parts of said curved blade;
5. creating adjacent to the concave parts of said curved blades, inside the spiral-form passages, a lowering of pressure, thereby initiating a centrifugal motion of the liquid metal inside the spiral-form passages; and
6. collecting said fraction of liquid metal, which has been given a high centrifugal speed by the foregoing steps, in a spiral collector.

9. A pump adapted to pump liquid metals by a drive effect, said pump comprising:
1. a generally cylindrical core having a high magnetic permeability and an axial duct for liquid metals open at the bottom of said pump;
2. an inoxidizable bell surrounding said generally cylindrical core on the top and sides thereof and defining an annular space in communication with the axial duct between the inner surface of said bell and the outer surface of said core, the inner surface of said bell being flared outwardly at its base;
3. a laminated stator entirely surrounding said bell;
4. a plurality of radially extending curved blades attached to the base of said core, said curved blades defining spiral conduits therebetween which are in communication with the annular space between said cone and said bell; and
5. an exit conduit in the form of a snail attached to the base of said bell and to the bottom of said curved blades such that the spiral conduits between said curved blades empty into said exit conduit, whereby when said pump is immersed in liquid metal and voltage is applied to said laminated stator in a manner creating a rotating magnetic field, liquid metal will rise in the axial duct in said core, will then be caused to rotate therein, will then be forced into the annular space between said core and said bell, and finally will be forced out the spiral conduits between said curved blades into said exit conduit.

10. A pump as claimed in claim 9 wherein said plurality of radially extending curved blades extend upwardly into the portion of the annular space between said core and said bell in which the inner surface of said bell is flared outwardly.

11. A pump as claimed in claim 9 wherein said plurality of radially extending curved blades are hollow and open at their ends remote from the axial duct of said core.

12. A pump as claimed in claim 9 wherein said plurality of radially extending curved blades are also attached to the base of said bell.

13. A pump as claimed in claim 9 and further comprising a protuberance which is approximately conical in shape and which is mounted on the inner surface of said bell in an orientation coaxial with the axial duct in said core.

14. A pump as claimed in claim 9 and further comprising an insulating layer surrounding said laminated stator.

* * * * *